May 13, 1952
L. B. REED
2,596,173
DIRECTION INDICATOR
Filed Nov. 17, 1950
2 SHEETS—SHEET 1
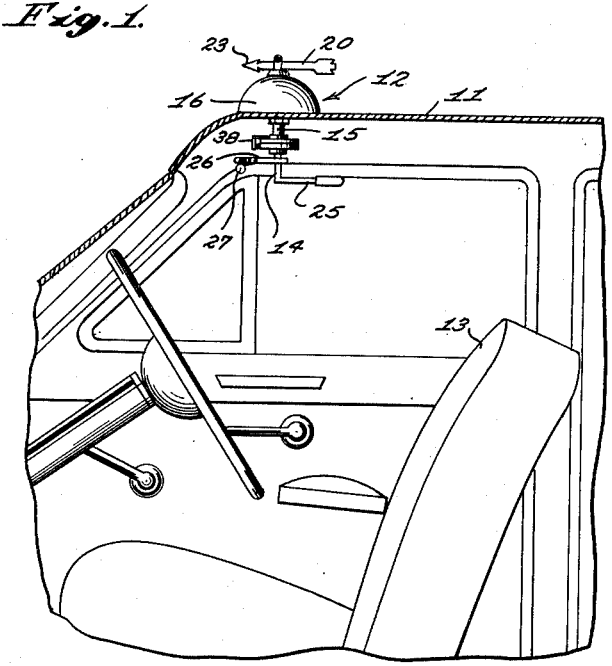
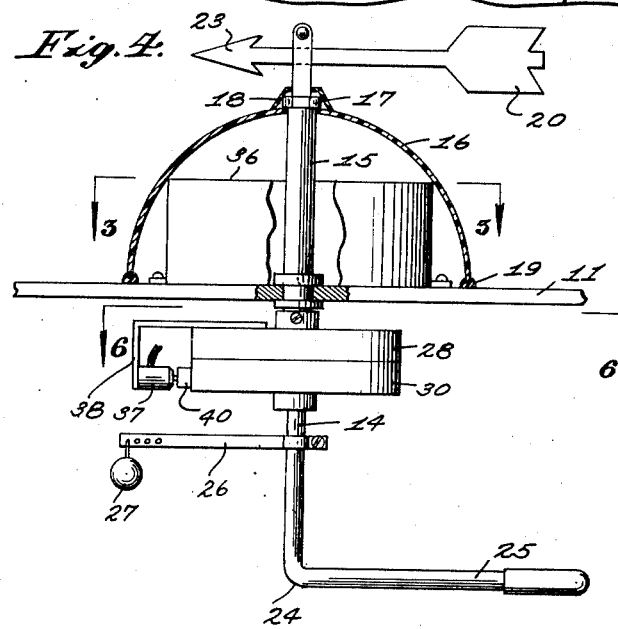
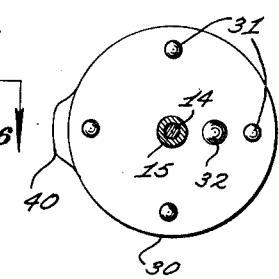
INVENTOR.
LISCOMB B. REED
BY
McMorrow, Berman + Davidson
ATTORNEYS May 13, 1952     L. B. REED     2,596,173
DIRECTION INDICATOR
Filed Nov. 17, 1950     2 SHEETS—SHEET 2
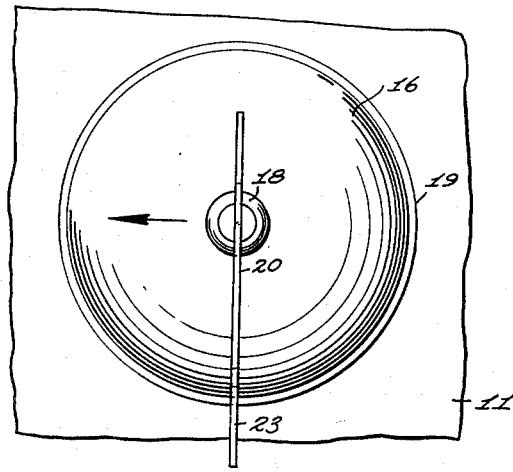
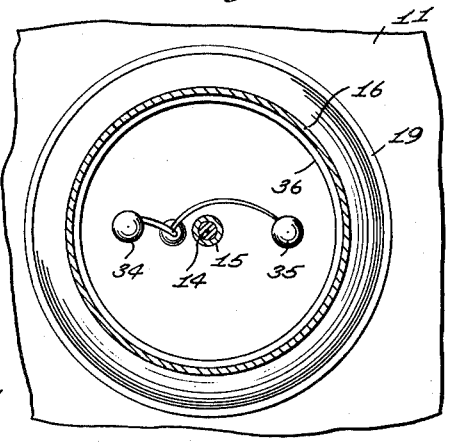
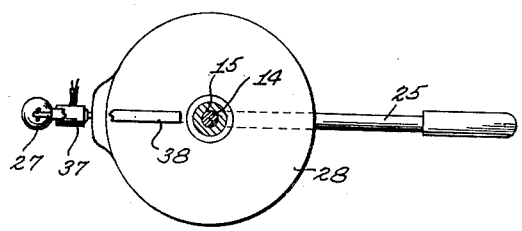
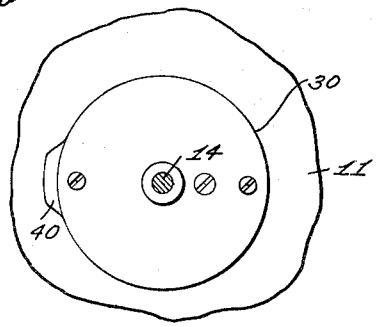
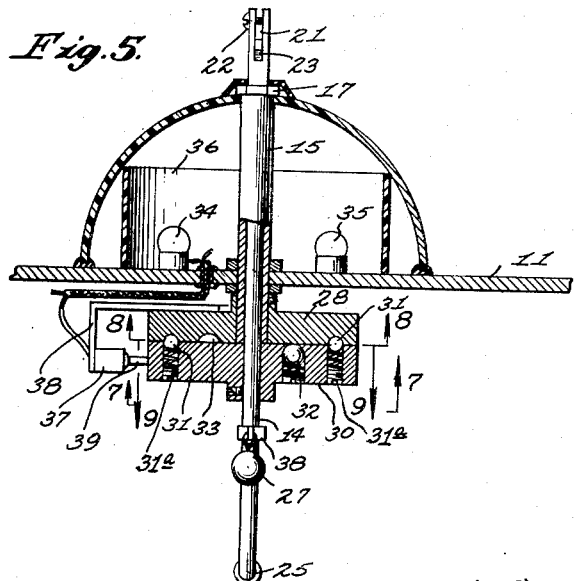
INVENTOR.
LISCOMB B. REED
BY
McMorrow, Berman & Davidson
ATTORNEYS Patented May 13, 1952

2,596,173

UNITED STATES PATENT OFFICE 2,596,173

DIRECTION INDICATOR

Liscomb B. Reed, Princeton, N. J.

Application November 17, 1950, Serial No. 196,248

3 Claims. (Cl. 177—327)

1

This invention relates to vehicle direction signals, and more particularly to a direction indicator which is mechanically operated from inside a vehicle, and which gives an external indication of the direction in which the vehicle is about to turn.

A main object of the invention is to provide a novel and improved vehicle direction signal device which is simple in construction, which is easy to install, and which is completely visible at all times at which a signal is being given.

A further object of the invention is to provide an improved vehicle direction indicator which is inexpensive to manufacture, which is sturdy in construction, which has high visibility, which is easy to operate, and which includes indicator means inside the vehicle on which it is mounted to notify the operator of the vehicle as to the condition of the direction indicator.

Further objects and advantages of the invention will become apparent from the following description and claims, and from the accompanying drawings, wherein:

Figure 1 is a fragmentary, longitudinal, cross-sectional view through a passenger automobile showing a direction indicator according to the present invention mounted on the roof of the automobile;

Figure 2 is an enlarged, top plan, detail view of the direction indicator of Figure 1;

Figure 3 is a cross-sectional view taken on line 3—3 of Figure 4 and showing the direction indicator in horizontal section;

Figure 4 is an enlarged vertical, cross-sectional view taken through the direction indicator of Figure 1;

Figure 5 is a vertical, cross-sectional view taken through the direction indicator in a plane at right angles to the plane of section employed in Figure 4;

Figure 6 is a cross-sectional view taken on line 6—6 of Figure 4;

Figure 7 is a cross-sectional view taken on line 7—7 of Figure 5;

Figure 8 is a cross-sectional view taken on line 8—8 of Figure 5;

Figure 9 is a cross-sectional view taken on line 9—9 of Figure 5.

Referring to the drawings, 11 designates the roof of a conventional passenger automobile, and 12 generally designates the improved direction indicator of the present invention, said direction indicator being installed on the roof 11 adjacent the driver's seat 13 of the automobile. Designated at 14 is a vertical shaft which extends

2 rotatably through a sleeve 15 rigidly secured to and extending through the roof 11, and projecting above said roof. Designated at 16 is a hemispherical housing which surrounds the upper portion of the sleeve 15 and which is clamped in a fixed position around the sleeve by a nut 17 threaded on the sleeve. Mounted on the shaft 14 above the nut 17 is a rubber shield 18 to prevent the entry of moisture into the space between the shaft 14 and the inner surface of sleeve 15. A suitable annular gasket 19 is provided between the rim of the housing 16 and the top surface of roof 11.

Designated at 20 is an indicator member which may be in the form of an arrow which is rigidly secured in any suitable manner to the top end of shaft 14. The top end of shaft 14 may be formed with a notch 21 in which the shank of the indicator arrow 20 is received and is clamped by means of a clamping bolt 22 extending through one of the segments defined by notch 21 and threadedly engaged with the opposite segment. As shown in Figures 1 and 4, the shank of the indicator arrow 20 is secured to the top end of shaft 14 adjacent the head 23 of the indicator arrow, whereby a substantial portion of the indicator arrow extends rearwardly of shaft 14 in such a manner that air resistance acting on the tail portion of the indicator arrow will exert substantial force tending to maintain said arrow in a position aligned with the direction of travel of the vehicle.

The lower end of shaft 14 is formed with a right-angled bend 24 defining a rearwardly extending handle portion 25 located within reach of the driver of the vehicle for rotating shaft 14 and the indicator arrow 20. Secured on the lower portion of shaft 14 is a horizontal bar member 26 extending parallel to the indicator arrow 20, but located inside the vehicle. Designated at 27 is a colored ball which is attached to the free end of bar 26, and serving as a signal means for indicating the position of the direction indicating arrow 20.

Secured to the lower portion of sleeve 15 is a first collar member 28 which is formed at its bottom surface with respective recesses 29 located at the same distance from the axis of shaft 14 and spaced 90° apart. Designated at 30 is a second collar member which is secured to the shaft 14 subadjacent the collar member 28 and which is provided with a plurality of spring-pressed balls 31 located at the same radial distance from the axis of shaft 14 as the recesses 29 and being spaced so as to be receivable in said recesses. The spring-pressed balls 31 are arranged so that when they are received in the recesses 29 of the stationary collar member 28, the shaft 14 will be yieldably held in either a longitudinally extending position, as shown in Figures 1 and 4, or in transversely extending positions indicating either turning of the vehicle to the right or turning of the vehicle to the left. The spring pressure on the balls 31 is relatively light, being merely sufficient to momentarily hold the shaft 14 in any of the aforementioned positions, but being insufficient to resist the effect of air pressure on the indicator arrow 20 when said arrow is directed transversely to the line of movement of the vehicle. When the vehicle is about to make a turn, the operator rotates the handle 25 in a direction which moves the ball 27 in the direction corresponding to that in which the turn is to be made. The handle 25 is rotated until the collar 30 is releasably locked in a rotated position corresponding to a turn of 90° by the action of the spring-pressed balls 31. As soon as the turn has been completed, wind pressure acting on the rear portion of the indicator arrow 20 exerts restoring torque on the shaft 14 which overcomes the resistance provided by the spring-pressed balls 31, and which rotates the arrow and the shaft 14 to their original positions. Designated at 32 is an auxiliary spring-pressed ball carried by the stationary collar 30 which is engageable in an additional recess 33 formed in the bottom surface of the collar 28, the ball 32 engaging in the recess 33 when the indicator arrow 20 is pointing in the forward direction of travel shown in Figures 1 and 4. The ball 32 has applied thereto substantially more spring pressure than the balls 31, and in order to disengage the ball 32 from the recess 33, it is necessary to exert manual torque on the handle 25. Therefore, the indicator arrow 20 is locked in its forward-indicating position and is not affected by the action of air on the indicator arrow. In order to rotate the indicator arrow from the normal positions of Figures 1 and 4, it is necessary to manually turn shaft 14 by means of handle 25.

Designated at 34 and 35 are respective lamps mounted inside the housing 16 and which are surrounded by a cylindrical reflector 36 secured to roof 11 inside said housing. The lamp 34 is mounted on one side of the indicator arrow 20 and the lamp 35 is mounted on the opposite side thereof. Designated at 37 is a switch which is supported on a bracket 38 secured to the stationary collar 28 and which is provided with an operating pin element 39 projecting radially toward the periphery of the collar 30. Collar 30 is formed at its periphery with a cam element 40 which is engageable with the pin element 39 when the shaft 14 is positioned as in Figure 1, namely, with the direction arrow 20 extending in a forwardly-pointing direction. Switch 37 is normally closed, but is held open by the engagement of cam 40 with the operating pin member 39. The lamps 34 and 35 are connected to the automobile battery through an energizing circuit which includes the switch 37, whereby said lamps are maintained de-energized when the direction arrow 20 extends in its forwardly-pointing position, and which become energized when the collar 30 is rotated to indicate either a left or right turn. Therefore, when the operator rotates shaft 14 by means of handle 25 to a position indicating either a right or a left turn, the lamps 34 and 35 become energized and illuminate the indicator arrow 20, making the signal clearly visible under night driving conditions. Under daytime conditions, the indicator arrow 20 will be clearly visible, since it is mounted on the top of the vehicle in a position wherein it may be seen from all directions. The arrow 20 is preferably made of colored material, such as plastic material of suitable color, such as blue or red. The housing 16 is preferably made of transparent plastic and the reflector 36 may be made of any suitable reflecting material, such as white plastic, highly polished metal, or the like. The reflector 36 provides an enclosure for the lamps 34 and 35 and also provides a support for the housing 16, since the top rim of the reflector 36 engages the under surface of said housing.

The indicator arrow is adjustable forwardly or rearwardly to increase or decrease the torque exerted by the arrow vane upon the operating shaft by air pressure as the automobile gains momentum after a turn, thereby insuring the return of the indicator to neutral position.

The spring pressure on the detent balls 31 is adjustable by means of the adjusting screws 31a shown thereunder in Figure 5, thereby providing adjustable pressure on said balls to suit the requirements of the individual driver.

While a specific embodiment of an improved direction indicator for motor vehicles has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a motor vehicle, a roof, a vertical sleeve member rigidly secured to and extending through said roof, a shaft rotatably mounted in said sleeve member, a direction indicator secured to the top end of said shaft, a handle secured to the lower end of said shaft, a first collar secured to the lower end of said sleeve member, a second collar secured to said shaft adjacent said first collar, and spring biased balls carried by said second collar and seatable in recesses formed in the said first collar upon rotation of said shaft for securing said shaft in selected adjusted rotated positions in said sleeve member.

2. In a motor vehicle, a roof, a vertical sleeve member rigidly secured to and extending through said roof, a shaft rotatably mounted in said sleeve member, a direction indicator secured to the top end of said shaft, a handle at the lower end of said shaft, a first collar securing the lower end of said sleeve member, a second collar secured to said shaft adjacent said first collar, spring biased balls carried by said second collar and seatable in recesses formed in said first collar upon rotation of said shaft for securing to said shaft in selected adjusted rotated positions in said sleeve member, a transparent housing on said roof subadjacent the direction indicator and surrounding the top portion of said sleeve member, a lamp in said housing, a switch dependingly supported from said first collar, an operating element on said switch adjacent the periphery of said second collar, a cam element on said periphery operatively engageable with said switch, and an energizing circuit connected to said lamp and including said switch.

3. In a motor vehicle, a roof, a vertical sleeve member rigidly secured to and extending through said roof, a shaft rotatably mounted in said sleeve member, a direction indicator secured to the top end of said shaft, a handle secured to the lower end of said shaft, a first collar secured to the lower end of said sleeve member, a second collar secured to said shaft adjacent said first collar, a first spring-pressed ball carried by one of the collars, the other collar being formed with a plurality of angularly spaced recesses in which said first ball is receivable to yieldably lock the shaft in selected rotated positions in said sleeve member, a second spring-pressed ball carried by said one of the collars, the other collar being formed with an additional recess in which said second ball is receivable and being arranged to yieldably lock said shaft in a position wherein the direction indicator points forwardly, a transparent housing on said roof subadjacent the direction indicator and surrounding the top portion of said sleeve member, a lamp in said housing, a switch dependingly supported from said first collar, an operating element on said switch located adjacent the periphery of said second collar, a cam element on said periphery operatively engageable with said switch, said switch being normally closed and being arranged to be opened when engaged by said cam element and the cam element being arranged to engage the switch when said indicator points forwardly, an energizing circuit connected to said lamp and including said switch, and a further indicator secured to the lower end portion of said shaft.

LISCOMB B. REED.

REFERENCES CITED

The following references are of record in the file of this patent:

UNITED STATES PATENTS

| Number | Name | Date |
|---|---|---|
| 1,365,360 | Weber | Jan. 11, 1921 |
| 1,725,248 | Bradbury et al. | Aug. 20, 1929 |
| 2,183,349 | Fukuhara | Dec. 12, 1939 |